Nov. 14, 1967     S. ZAROMB     3,352,715
BATTERY COMPRISING ALTERNATING LAYERS OF NOBLE METAL
AND SALT-CONTAINING SUBSTANCE
Filed Oct. 22, 1963

INVENTOR
SOLOMON ZAROMB

United States Patent Office 3,352,715
Patented Nov. 14, 1967

3,352,715
BATTERY COMPRISING ALTERNATING LAYERS OF NOBLE METAL AND SALT-CONTAINING SUBSTANCE
Solomon Zaromb, 376 Monroe St., Passaic, N.J. 07055
Filed Oct. 22, 1963, Ser. No. 318,052
5 Claims. (Cl. 136—83)

This invention relates to an ultra-high-power-energy-density battery.

It is an object of the invention to provide a compact battery capable of delivering more than a megawatt of electricity per cubic centimeter of battery volume for periods of less than a millisecond.

It is a further object of the invention to provide a high-energy-density-ultra-high-power battery having a long shelf-life.

It is still a further object of the invention to provide a rechargeable high-energy-density battery utilizing electrode materials which are not now in common use such as aluminum anodes and noble metal halide cathodes.

It is still a further object of the invention to provide means for rapidly activating the afore-mentioned high-energy-density battery after prolonged shelf-life.

Figure 1:
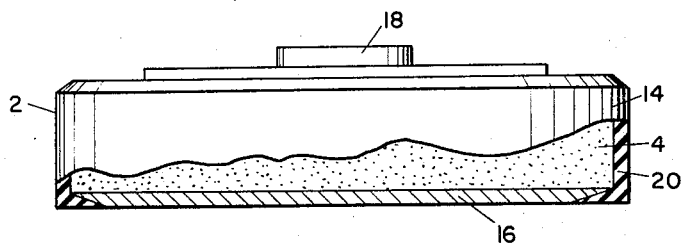
Figure 2:
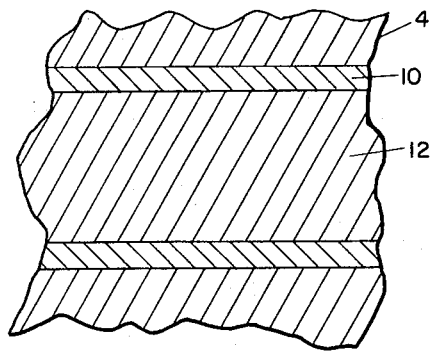
Figure 3:
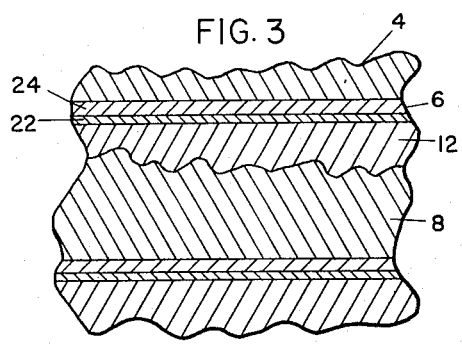

The invention is most readily understood with reference to the drawing in which FIGURES 2 and 3 diagrammatically represent alternate magnified cross-sectional views of the essential constituent 4 of the battery pile 2 presented diagrammatically in FIGURE 1.

According to the invention, the battery pile 2 consists of a large number of extremely thin superimposed cell layers each of which may have a thickness in the range between 0.05 and 100 microns. Each layer comprises an extremely thin bipolar electrode 6 and a solid mixture 8 of cathode material and of a salt or salt mixture which is solid at ordinary temperatures but has a relatively low melting point between 30° C. and 200° C., preferably between 50° C. and 100° C. Means is provided for rapidly melting the salt or salt containing mixture immediately prior to battery discharge or charge and for solidifying the electrolyte immediately after charge or recharge.

In one preferred embodiment of the invention, the uncharged battery consists of many successive alternating layers of gold 10 and of aluminum bromide 12, said layers being formed either by successive evaporations in vacuum or by dipping thin gold foils in molten aluminum bromide, draining and wiping off the excess melt and bringing together a number of the thin wetted foils. These operations must, of course, be performed in the absence of water or oxygen, and the battery must be heremetically sealed in enclosure 14 to prevent formation of aluminum oxide. The hermetic enclosure 14 comprises the two external electrodes 16 and 18 and an insulating non-reactive encapsulant 20.

Charging at a temperature near the melting point of aluminum bromide results in the formation of a layer 22 of aluminum and of an $AlBr_3$—$AuBr_3$ mixture 8 at opposite sides of each gold foil or film 24. To prevent recombination of the aluminum with the auric bromide via diffusion of $AuBr_3$ through the molten electrolyte, the charging should proceed as rapidly as possible and the $AlBr_3$ should be frozen immediately after completion of the charge. In order to activate the battery rapidly for discharge it suffice to apply a fast pulse of electromagnetic energy dissipating sufficient heat in the battery to cause melting of the $AlBr_3$. Said pulse may consist of a flash of light or of a low-voltage high-frequency high electric current induced in the bipolar electrodes 6 or of a low-current high-voltage pulse discharged through the solid electrolyte battery.

Of course, the energy required to melt the $AlBr_3$ should be much less than that available in the battery itself. With the battery initially at room temperature an energy input of less than 250 joules per cubic centimeter suffices to melt all the $AlBr_3$. On the other hand, the energy content in a battery containing 0.05 gram/cm.$^3$ Al plus 0.75 gram/cm.$^3$ $AuBr_3$ exceeds 1000 joules. Furthermore, to minimize the amount of auxiliary energy required to activate the battery, it surfices to cause only partial melting of the $AlBr_3$ so as to impart sufficient conductivity to the battery to initiate discharge. Complete melting then results from internal energy dissipation in the rapidly discharging battery.

The extremely high discharge rate is made possible by the extremely small electrode spacings which may be in the range between 0.05 micron and 100 microns, the preferred range between 0.1 and 10 microns. Such small spacings allow very high current densities without appreciable internal resistance losses once the $AlBr_3$ is mostly molten. For example, with a 5-micron spacing, a current density of 100 amperes per square centimeter results in an internal resistance drop of less than 0.5 volt per cell compared with an open circuit cell voltage of approximately 2.5 volts.

In another embodiment of the invention platinum may be used in lieu of gold, the resulting cathode material being platinum tetrabromide. The open-circuit voltage of the Al—$AlBr_3$—$PtBr_4$—Pt cell is approximately 2.3 volt or about 0.2 volt less than that of the $$Al—AlBr_3—AuBr_3—Au$$

cell.

Thereo will now be obvious to those skilled in the art many modifications and variations of the power source set forth above. These mdifications and variations will not depart from the scope of the invention if defined by the following claims.

I claim:

1. A battery pile comprising at least two bi-polar electrodes, each of said electrodes consisting of the same noble metal, said electrodes being separated by a solid substance consisting essentially of a salt, said salt selected from the group consisting of aluminum bromide, gold bromide, and platinum bromide, a source of energy for heating said salt, and means for applying energy to said salt so as to cause at least partial melting thereof and render said salt conductive and to thereby activate said pile.

2. Apparatus as claimed in claim 1 wherein said salt melts at least in part at a temperature between 50° C. and 100° C.

3. Apparatus as claimed in claim 1 wherein the thickness of any composite layer of noble metal and a substance consisting essentially of a salt is in the range between 0.05 micron and 100 microns.

4. A battery as claimed in claim 1 consisting essentially of at least one aluminum anode and at least one noble metal halide cathode.

5. Apparatus as claimed in claim 1 wherein said means comprises a source of electro-magnetic energy.

References Cited

UNITED STATES PATENTS

| 2,666,801 | 1/1954 | Victoreen | 136—90 X |
| 2,954,417 | 9/1960 | Lehovec et al. | 136—176 X |
| 3,113,047 | 12/1963 | Lasser et al. | 136—6 |

WINSTON A. DOUGLAS, Primary Examiner.

B. J. OHLENDORF, A. SKAPARS, Assistant Examiners.